(12) United States Patent
Herbelleau et al.

(10) Patent No.: US 6,997,224 B2
(45) Date of Patent: *Feb. 14, 2006

(54) TIRE HAVING AN IMPROVED CARCASS REINFORCEMENT ANCHORING STRUCTURE

(75) Inventors: Yves Herbelleau, Carqueiranne (FR); Bernard Guerinon, Clermont-Ferrand (FR); Pierre Roux, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 267 days.

This patent is subject to a terminal disclaimer.

(21) Appl. No.: 10/329,890

(22) Filed: Dec. 26, 2002

(65) Prior Publication Data

US 2003/0150541 A1 Aug. 14, 2003

Related U.S. Application Data

(63) Continuation of application No. PCT/EP01/07224, filed on Jun. 25, 2001.

(30) Foreign Application Priority Data

Jun. 29, 2000 (FR) .................................. 00 08451

(51) Int. Cl.
*B60C 15/00* (2006.01)
*B60C 15/024* (2006.01)
*B60C 15/06* (2006.01)
*B60C 9/02* (2006.01)

(52) U.S. Cl. ...................... 152/544; 152/539; 152/545; 152/547; 152/548; 152/550

(58) Field of Classification Search ................ 152/539, 152/542–545, 547, 548, 550, 552
See application file for complete search history.

(56) References Cited

U.S. PATENT DOCUMENTS

| 4,832,102 | A | 5/1989 | Domchick |
| 4,895,692 | A | 1/1990 | Laurent et al. |
| 5,093,267 | A | 3/1992 | Miura et al. |
| 5,660,656 | A | 8/1997 | Herbelleauu et al. |
| 5,702,548 | A | 12/1997 | Arnaud et al. |
| 6,000,454 | A | 12/1999 | Barody et al. |
| 6,109,321 | A | 8/2000 | Costa Pereira et al. |
| 6,224,808 | B1 | 5/2001 | Essinger et al. |
| 6,234,227 | B1 | 5/2001 | Bosseaux |
| 6,357,502 | B1 * | 3/2002 | Caretta .................. 152/544 X |
| 6,523,591 | B1 | 2/2003 | Billieres et al. |
| 6,766,839 | B1 * | 7/2004 | Caretta .................. 152/550 X |
| 2002/0170647 | A1 * | 11/2002 | Pereira et al. ............. 152/451 |
| 2003/0062107 | A1 * | 4/2003 | Leblond et al. ............. 152/547 |

(Continued)

FOREIGN PATENT DOCUMENTS

EP 0242840 10/1987

(Continued)

*Primary Examiner*—Adrienne C. Johnstone
(74) *Attorney, Agent, or Firm*—Buchanan Ingersoll PC

(57) ABSTRACT

A tire comprising a crown, two sidewalls and two beads, a carcass reinforcement anchored in each of the beads and a crown reinforcement. The carcass reinforcement comprises at least two circumferential alignments of first reinforcing threads of high elasticity modulus, each circumferential alignment of the first reinforcing threads being, within each bead, bordered axially by second reinforcing threads oriented substantially circumferentially. The first reinforcing threads and the second reinforcing threads are separated by a layer of mix of very high elasticity modulus. The second reinforcements are arranged in a spiral and formed of monofilaments or unit threads of steel.

16 Claims, 3 Drawing Sheets

U.S. PATENT DOCUMENTS

| | | | |
|---|---|---|---|
| 2003/0150540 A1 * | 8/2003 | Herbelleau et al. | 152/451 |
| 2003/0150542 A1 * | 8/2003 | Herbelleau et al. | 152/547 X |
| 2003/0155061 A1 * | 8/2003 | Herbelleau et al. | 152/547 X |

FOREIGN PATENT DOCUMENTS

| | | |
|---|---|---|
| EP | 0582196 | 2/1994 |
| EP | 0664232 | 7/1995 |
| EP | 0718090 | 6/1996 |
| EP | 0751015 | 1/1997 |
| EP | 0822047 | 2/1998 |
| EP | 0 983 876 A2 * | 3/2000 |
| FR | 2771050 | 5/1999 |
| WO | 9747463 | 12/1997 |
| WO | 9854006 | 12/1998 |
| WO | 0034059 | 6/2000 |
| WO | WO-00/34059 A1 * | 6/2000 |

* cited by examiner

TIRE HAVING AN IMPROVED CARCASS REINFORCEMENT ANCHORING STRUCTURE

CROSS REFERENCE TO RELATED APPLICATIONS

This is a continuation of international application PCT/EP01/07224 filed Jun. 25, 2001, which was published in French as international publication WO 02/00452 A1 on Jan. 3, 2002.

FIELD OF THE INVENTION

The invention relates to a tire intended to bear heavy loads and inflated to very high pressure, greater than 12 bar, such as, for example, an aircraft tire, a heavy-vehicle tire, or a construction vehicle tire.

THE RELATED ART

Aircraft tires must withstand extreme conditions during service, in particular in terms of applied load and speed, taking into account their low weight and size. As a result, despite their very high inflation pressures, greater than 12 bar, their loading or deflection during operation may commonly reach values double those observed for heavy-vehicle tires or passenger-car tires.

During takeoff, very high speeds, of the order of 350 km/hour, are achieved, and hence heating conditions exist which are also very severe.

All these conditions are particularly disadvantageous for the endurance of the beads of the tires.

U.S. Pat. No. 4,832,102 describes an aircraft tire comprising a crown, two sidewalls and two beads, a carcass reinforcement and a crown reinforcement, in which the carcass reinforcement comprises two circumferential alignments of reinforcing threads of high elasticity modulus anchored in the two beads. The crown reinforcement comprises at least one working block with at least one ply of reinforcing threads of high elasticity modulus. The carcass reinforcement is anchored in the beads by turning up, around a bead wire, the two circumferential alignments of first reinforcing threads of high elasticity modulus.

Patent documents EP 0 582 196, EP 0 664 232 and U.S. Pat. No. 5,660,656 have recently proposed, in the case of passenger-vehicle tires, a novel type of carcass reinforcement for a tire and of the anchoring thereof in the two tire beads. A tire, in accordance with these applications, comprises a bead with means for anchoring the carcass reinforcement comprising reinforcing threads oriented substantially circumferentially and axially bordering the circumferential alignments of the reinforcing threads of the carcass reinforcement.

Application WO 98/54006 (U.S. Pat. No. 6,109,321) proposes a tire, the carcass reinforcement of which comprises two or three circumferential alignments of reinforcing threads in which each circumferential alignment is bordered axially to the inside and to the outside by reinforcing threads oriented substantially circumferentially. This application mentions numerous types of reinforcing threads for constituting the circumferential reinforcing threads.

In what follows, "linear density" is understood to mean the weight in grams of one thousand meters of a reinforcing thread. The linear density is expressed in tex. The stress to which a reinforcing thread is subjected and the modulus of this reinforcing thread are expressed in "cN/tex", cN meaning centinewton.

"Reinforcing thread" is understood to mean any reinforcement element in the form of a thread which is able to reinforce a given matrix, for example a rubber matrix. As reinforcing threads, mention will be made, for example, of multifilament yarns, these yarns possibly being twisted on themselves or not, unit threads such as single cords of high elementary diameter, with or without a twist on themselves, cabled yarns or plied yarns ("cords") obtained by cabling or plying operations on such unit threads or yarns, such reinforcing threads possibly being hybrid ones, that is to say, composite ones, comprising elements of different natures.

"Plied yarn" (or "folded yarn") is understood to mean a reinforcing thread formed of two single yarns or more assembled together by plying operations. Such single yarns, which are generally formed of multifilament yarns, are first of all plied individually in one direction (S or Z direction of twist) during a first plying stage, then twisted together in the opposite direction (Z or S direction of twist, respectively) during a second plying stage.

"Adherent reinforcing thread" is understood to mean a reinforcing thread which has undergone an appropriate coating treatment, referred to as sizing or adherization treatment, capable of making the reinforcing thread, after suitable heat treatment, adhere to the matrix for which it is intended.

"Axial" is understood to mean a direction parallel to the axis A of the tire. This direction may be "axially inner" when it is directed towards the inside of the tire and "axially outer" when it is directed towards the outside of the tire.

"Radial" is understood to mean a direction perpendicular to the axis A of the tire and passing through the axis A. This direction may be "radially inner" or "radially outer" depending on whether it is directed towards the axis A or towards the outside of the tire.

"Substantially circumferential orientation" is understood to mean an orientation which does not diverge by more than five degrees from the circumferential direction.

"Elasticity modulus" of a rubber mix is understood to mean a secant modulus of extension at 10% deformation and at ambient temperature.

SUMMARY OF THE INVENTION

The subject of the invention is a tire having improved anchoring of the carcass reinforcement.

The tire according to the invention comprises a crown, two sidewalls and two beads, a carcass reinforcement anchored in the two beads and a crown reinforcement. The tire is such that the carcass reinforcement comprises at least two circumferential alignments of first reinforcing threads of high elasticity modulus, each circumferential alignment of the first reinforcing threads being, within each bead, bordered axially by second reinforcing threads oriented substantially circumferentially of a modulus greater than or equal to that of the first reinforcing threads, the first reinforcing threads and the second reinforcing threads being separated by a layer of mix of very high elasticity modulus, and is such that the second reinforcing threads are formed of monofilaments or unit threads arranged in a spiral and selected from the group consisting of carbon, tungsten, high-modulus aramid and steel reinforcing threads.

The selection of monofilaments of very high elasticity moduli as second reinforcing threads has the advantage of providing, for a given rigidity of extension of the second reinforcing threads, great compactness of the bead structure. This is particularly noticeable for aircraft tires, the bulk of which is very strictly controlled.

According to one advantageous selection, the second reinforcing threads selected are steel monofilaments of a diameter of between 0.7 and 1.3 mm. When their diameter exceeds 1.3 mm, the implementation thereof becomes very difficult because the reinforcing thread is no longer sufficiently flexible, and when their diameter decreases below 0.7 mm, their application takes too long. The cost of the structure of the bead is also reduced because the cost of the monofilaments of steel is very significantly less than that of the metal cables conventionally used in the tire industry.

The use of such monofilaments as second anchoring reinforcing threads is particularly indicated in the case of aircraft tires, but it is also appropriate for any tire for heavy loads where it is desired to reduce the bulk of the bead structure, for example for heavy-vehicle tires or construction-vehicle tires.

Advantageously, each circumferential alignment of the first reinforcing threads is, within each bead, bordered axially inwardly and axially outwardly by second reinforcing threads oriented substantially circumferentially.

The first reinforcing threads preferably have a secant modulus of extension greater than 1000 cN/tex and are, for example, formed of aromatic polyamide.

The layer of mix of very high elasticity modulus has a Shore A hardness greater than 70. This layer may also have a secant modulus of extension at 10% deformation greater than 20 MPa and preferably greater than 30 MPa.

In a preferred embodiment, the carcass reinforcement of the tires according to the invention comprises two or three circumferential alignments of reinforcing threads of high elasticity modulus, of aromatic polyamide, for example.

Two circumferential alignments are necessary in order to withstand the very high mechanical stresses which occur, but the number of alignments preferably does not exceed three in order not to increase harmfully the flexural rigidity of the sidewalls.

According to an advantageous characteristic of the tire according to the invention, considering $\Sigma R_I$ as the total of the rigidities of extension of the second reinforcing threads arranged axially inwardly relative to the carcass reinforcement and considering $\Sigma R_E$ as the total of the rigidities of extension of the second reinforcing threads arranged axially on either side of the carcass reinforcement, then:

$$0.6 \leq \frac{\sum R_I}{\sum R_E} \leq 1.5$$

and preferably:

$$0.7 \leq \frac{\sum R_I}{\sum R_E} \leq 1.3$$

Keeping within these limits for the ratio between the total rigidity of extension of the second reinforcing threads arranged to the inside of the carcass reinforcement in each bead and the total rigidity of extension of the second reinforcing threads arranged to the outside of the carcass reinforcement has the advantage of making the stressing of the second reinforcing threads in the bead more homogenous, whatever their position.

According to another preferred characteristic, the outer surface of the bead of the tire according to the invention comprises a seat followed by a frustoconical wall of substantially radial orientation radially inwardly adjacent to a wall of a cross-section which is substantially in the form of an arc of a circle having a center C arranged externally relative to the bead. Such walls are intended to bear against the hook and the flange of a suitable rim. Considering a straight line CD, passing through the center C and the bead of the tire, forming an angle $\alpha=+45\pm5$ degrees relative to the axis A of the tire, all of the second reinforcing threads are arranged at a radial distance from the axis of the tire which is less than or equal to the locus of the line CD. The line CD defines substantially an embedding zone which is very rigid, in which the deformations are very reduced and a zone of flexure radially above CD. The fact that all the second reinforcing threads are in the embedding zone reinforces the endurance of the bead.

Preferably, the bead of the tire according to the invention has an outer surface intended to come into contact with the corresponding surface of the seat and of the hook of the rim. After mounting on the rim and inflation of the tire, the contact zone between the outer surface of the bead and the rim extends at least as far as point B of the hook of maximum radius $R_J$.

If $\Phi$ is the diameter of the circumference of the outer surface of the bead intended to come to bear against the circumference of the hook of the rim of maximum radius $R_J$, then advantageously:

$$\Phi = 2(R_J - \epsilon)$$

with $\epsilon$ being between 0.5 and 2 mm.

This enables the bead to be "seated" properly on the seat and the hook of the rim and has the advantage of limiting the curvature of the circumferential alignments of the carcass reinforcement during travel, particularly in the contact area.

According to an advantageous embodiment, the first reinforcing threads of the carcass reinforcement form forward and return paths arranged adjacently, with, at the level of each bead, loops connecting one forward path to one return path each time.

BRIEF DESCRIPTION OF THE DRAWINGS

The characteristics and advantages of the invention will be better understood with reference to the following description, which refers to the appended drawings, which illustrate exemplary embodiments in non-limitative manner in the case of aircraft tires, and in which.

DETAILED DESCRIPTION OF EXEMPLARY EMBODIMENTS

Figure 1:
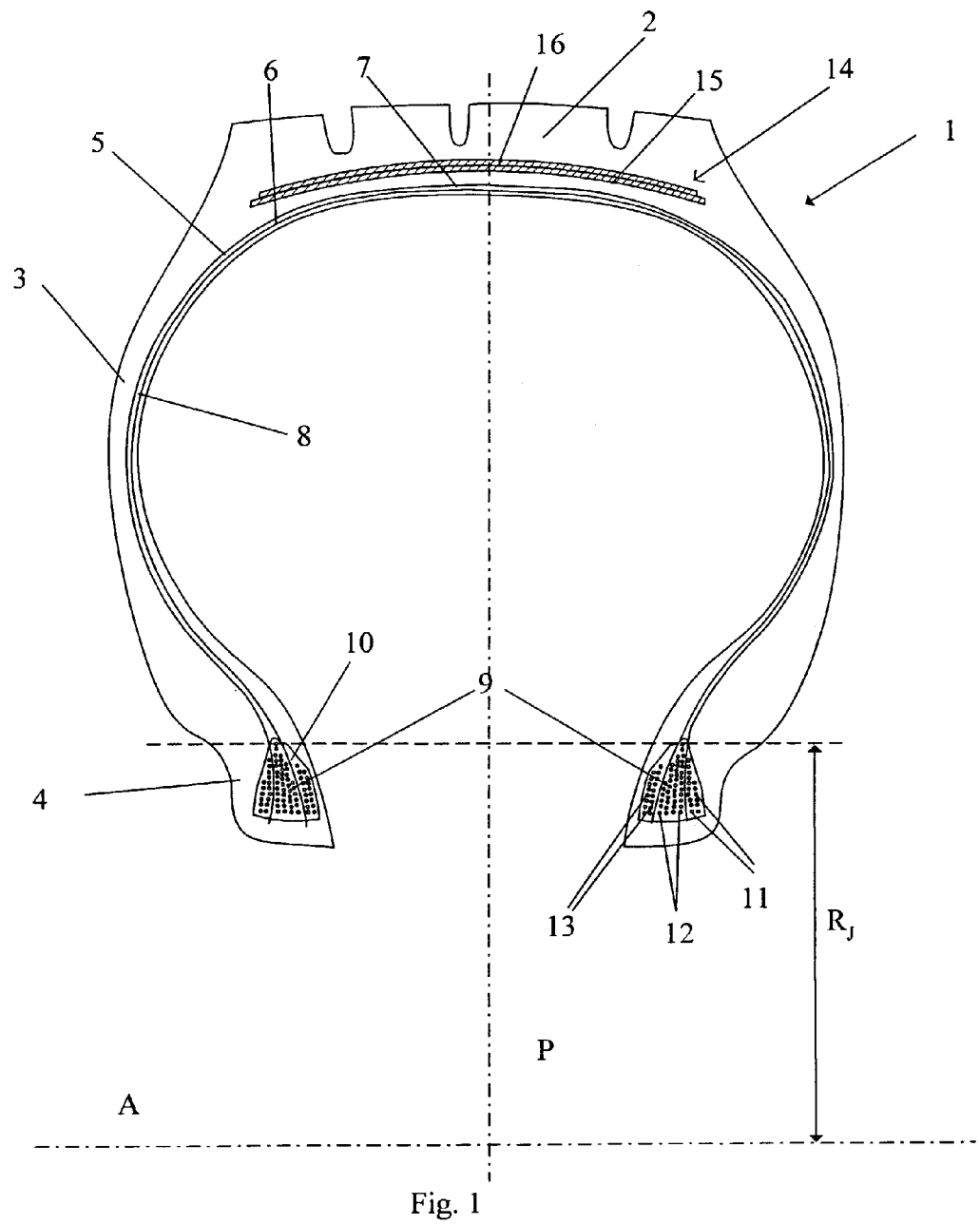
FIG. 1 is a diagram, viewed in axial section, of one embodiment of a tire according to the invention.

The aircraft tire 1 shown diagrammatically in axial half-section in FIG. 1 comprises a crown 2, two sidewalls 3 and two beads 4. A carcass reinforcement 5 extends from one bead to the other and is formed of two circumferential alignments 6 and 7 of first reinforcing threads. The circumferential alignments of the first reinforcing threads 6 and 7 are oriented radially in the sidewalls 3 and are formed of reinforcing threads of aromatic polyamide or aramid. The first reinforcing threads are arranged in parallel and are separated by a layer of mix 8, the nature and modulus of which are adapted according to their position in the tire.

Anchoring of the two circumferential alignments 6 and 7 is ensured in the beads 3 by alignments or "stacks" 9 of second circumferentially oriented reinforcing threads arranged axially on either side of each circumferential alignment of the first reinforcing threads 6 and 7. Each alignment or stack 9 of second reinforcing threads may be obtained by helical winding of a reinforcing thread. The first, radial reinforcing threads, and the second, circumferential reinforcing threads are separated from each other by a layer of rubber mix 10 of very high elasticity modulus in order to avoid all direct contact of one reinforcing thread with another. The layer 10 has a Shore A hardness greater than 70. Its secant modulus of extension at 10% deformation may also be greater than 20 MPa and preferably is greater than 30 MPa. The tension which develops in the first reinforcing threads 6 and 7 upon inflation of the tire 1 is taken up in particular by the lateral adhesion between each circumferential alignment 6 and 7 and the stacks 9 of circumferential reinforcing threads. This bead structure ensures excellent anchoring, which remains very effective even for the very high inflation pressures of aircraft tires, i.e., greater than 12 bar and possibly reaching 25 bar in certain specific applications.

The stacks 9 of second reinforcing threads are distributed into three groups, two stacks 11 arranged axially outwardly to the carcass reinforcement 5 on the outside of the tire, two stacks 13 arranged axially inwardly relative to the carcass reinforcement 5, on the inside of the tire, and four stacks 12 arranged between the two circumferential alignments 6 and 7 of the carcass reinforcement 5.

The second reinforcing thread used in this tire is a monofilament or unit thread of steel of a diameter of 0.98 mm. This reinforcing thread is of course adherized with a brass or zinc coating. The use thereof makes it possible to achieve a very small bulk for a very great rigidity of extension of the set of stacks 9. The cost thereof is also lower than for the assemblies conventionally used in tires.

Preferably, where $\Sigma R_I$ is the total of the rigidities of extension of the second reinforcing threads 12 arranged to the inside of the carcass reinforcement 5 and $\Sigma R_E$ is the total of the rigidities of extension of the second reinforcing threads 11, 13, arranged on either side of the carcass reinforcement 5, we have:

$$0.6 \le \frac{\sum R_I}{\sum R_E} \le 1.5$$

and advantageously $$0.7 \le \frac{\sum R_I}{\sum R_E} \le 1.3.$$

In the case of the tire described, considering the number of turns arranged inwardly and outwardly relative to the carcass reinforcement, then:

$\Sigma R_I/\Sigma R_E \cong 1.24$.

This has the advantage of homogenizing the mechanical stress of the second reinforcing threads in the bead.

It may also be noted that the number of turns of the stacks decreases gradually with distance relative to the axis A of the tire 1. The result is a substantially conical form of the arrangement of the second reinforcing threads. This has the advantage of greatly stabilizing the beads 4 upon inflation of the tire and upon passage into the contact area during operation.

All the turns of the stacks 9 are embedded in the rubber mix 10 of very high elasticity modulus to ensure good taking-up of the forces due to the inflation pressure and thus excellent anchoring of the carcass reinforcement in the beads 4.

Figure 2:
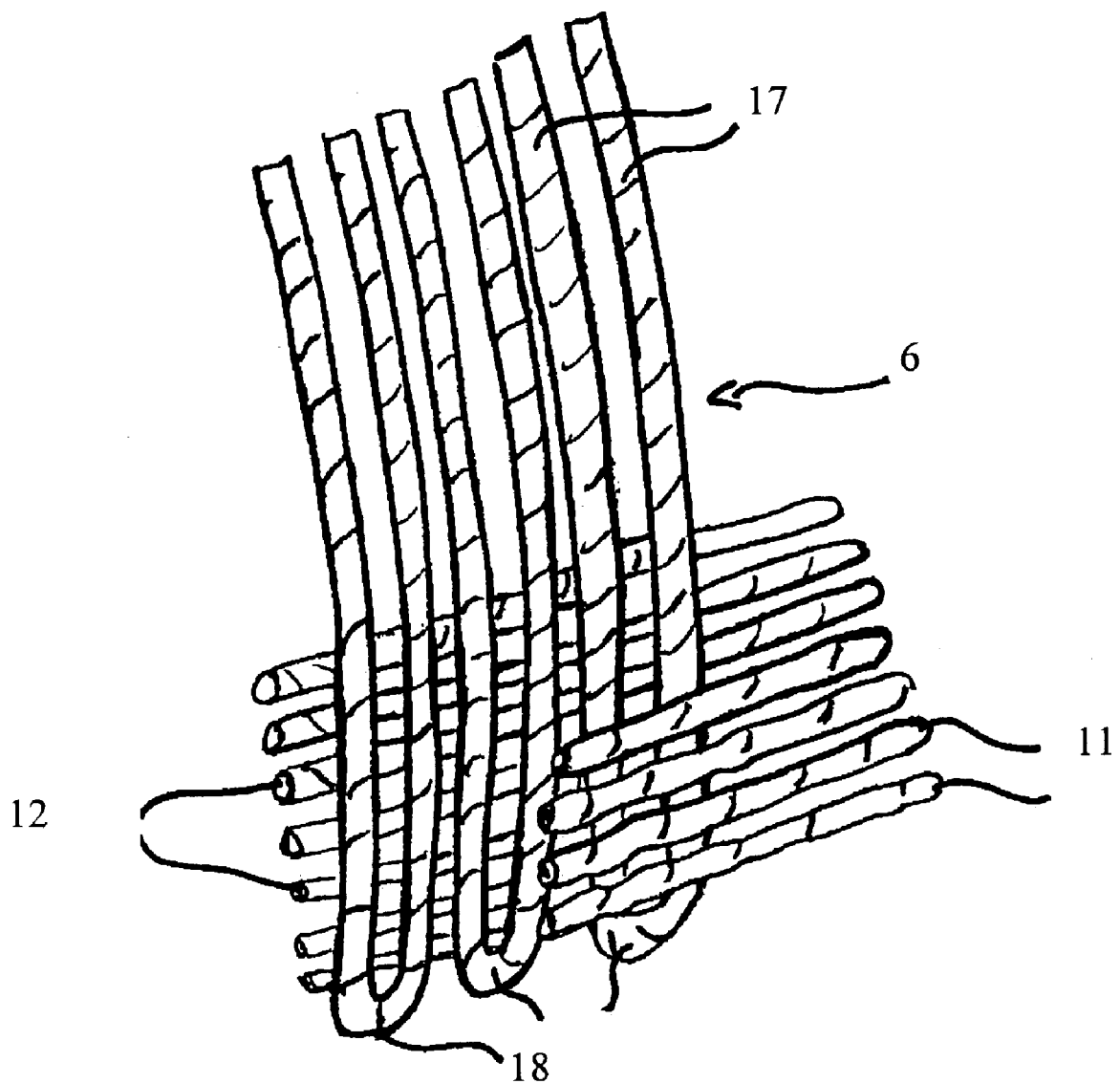
FIG. 2 is a perspective view, illustrating diagrammatically the arrangement of part of the reinforcing threads of the carcass reinforcement according to the invention.

FIG. 2 is a perspective view of one of the circumferential alignments of the first reinforcing threads, the alignment 6, in which only the reinforcing threads are shown. In this figure, there can be seen the circumferential alignment 6 of first reinforcing threads which is formed of portions of reinforcing threads 17. At their radially lower ends, the portions of the reinforcing threads 17 form juxtaposed loops 18, located in the bead 4. The loops 18 are adjacent and do not overlap. On either axial side of the circumferential alignment 6 of first reinforcing threads, there are shown only the stacks 11 and 12 directly adjacent to this alignment 6. For clarity of the drawing, only the circumferential alignment 6 of first reinforcing threads and two stacks have been shown, but the circumferential alignment 7 of first reinforcing threads has the same arrangement of the portions of the reinforcing threads 17.

Figure 3:
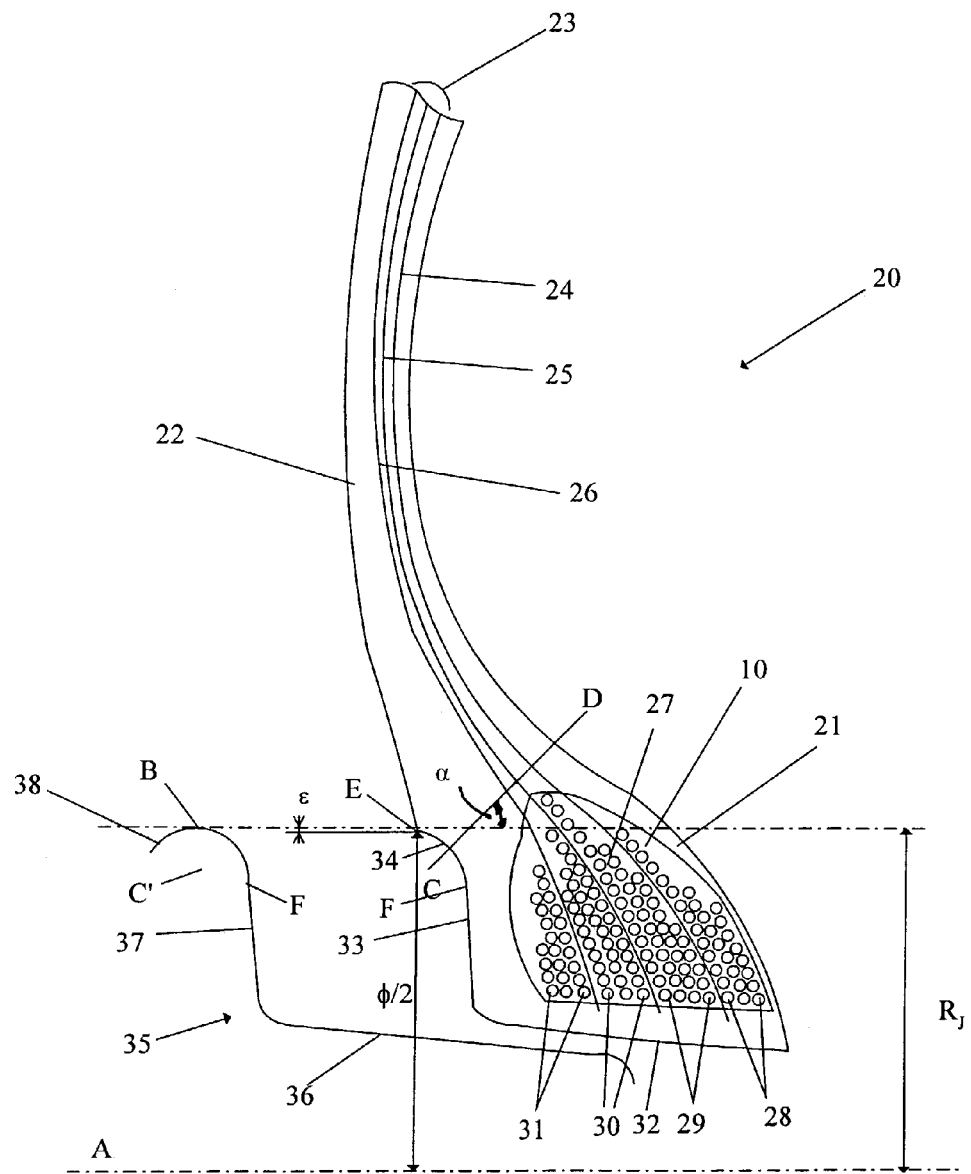
FIG. 3 shows a bead of a second embodiment.

FIG. 3 shows a bead 21 and a sidewall 22 of a second embodiment of a tire 20 according to the invention, in which the carcass reinforcement 23 is formed of three circumferential alignments 24, 25, 26 of reinforcing threads of aromatic polyamide or aramid. In the bead 21, there are arranged stacks 27 of second reinforcing threads of circumferential orientation. These stacks 27 are here separated into four groups. There are found in succession axially from the inside of the bead towards the outside, three stacks 28 arranged inwardly relative to the circumferential alignment of the first reinforcing thread 24, four stacks 29 arranged between the circumferential alignments of the first reinforcing threads 24 and 25, three stacks 30 arranged between the circumferential alignments 25 and 26, and three stacks 31 arranged axially outwardly relative to the alignment 26.

As previously, the second reinforcing threads are formed of monofilaments or unit threads of steel and the number of turns is such that it can be seen that the total of the rigidities of extension of the stacks arranged outwardly relative to the carcass reinforcement 23 is substantially of the same order as the total of the rigidities of extension of the stacks arranged internally relative to the carcass reinforcement 23.

The outer surface of the bead 21 comprises a seat 32, a frustoconical wall of substantially radial orientation 33 which is radially inwardly adjacent to a wall 34, the section of which is an arc of a circle EF of center C. The center C is arranged to the outside of the bead 21. Considering the straight line CD which passes through the center C and the bead forming an angle $\alpha=+45\pm5$ degrees relative to the axis A of the tire (this angle is determined when the tire is mounted on its rim), it will be noted that all of the second reinforcing threads 28–31 are arranged at a radial distance from the axis A which is less than or equal to the locus of line CD. The line CD defines substantially an embedding zone radially inwardly thereof which is very rigid, in which the deformations are very reduced, and a zone of flexure radially above CD. The fact that all the second reinforcing threads are in the embedding zone reinforces the endurance of the bead.

The outer surface of the bead is intended to come to bear against the wall of a rim 35 whose outer profile is also shown in FIG. 3. This profile comprises the seat 36 and the substantially radial wall of the hook 37 followed by the flange 38. The flange 38 has a cross-section in the shape of an arc of a circle of center C'. The highest point of diameter is B, of radius RJ. The point E arranged on the axially outer surface of the bead 21 is intended to come into contact with substantially the point B. When the tire is mounted on the rim 35, the surfaces 34 are 38 are homocentric, that is to say that their centers C and C' are identical. Point E is located on a circumference of diameter $\Phi$. There is the relationship:

$$\Phi = 2(R_J - \epsilon)$$

with $\epsilon$ being between 0.5 and 2 mm.

The slight offset of point E between its free position and its position mounted on the rim, in contact with B, enables the bead to be placed slightly in extension when it is mounted on the rim and promotes the quality of the contact obtained. This contact as far as point E reinforces the stability of the bead during the pressurization of the tire and upon passage into the contact area during operation. Consequently, it will be noted that the circumferential alignments of the carcass reinforcement 23 are substantially less stressed in compression upon passage into the contact area, contrary to what happens for aircraft tires of conventional structure.

FIG. 1 also shows an example of a crown reinforcement 14. This is formed of a working block comprising two plies of reinforcing threads 15 and 16 of substantially circumferential orientation obtained by helical winding of at least one reinforcing thread. Such reinforcing thread is formed of reinforcing threads of aromatic polyamide or aramid. The number of reinforcement plies and the laying pitch are adapted according to the dimension of the tire and the conditions of use thereof. This embodiment of a crown reinforcement has the advantage of providing very effective hooping, which minimizes the variation in the dimensions of the tire upon inflation and at high speed. It will be noted that the development of the profile may be three to four times less than for a conventional aircraft tire such as a 30–7.7R16 AIRX. This excellent hooping also has the advantage of not placing the mixes forming the tread of the crown of the tire under high extension. The cracking at the surface of the tread due to the ozone present in the air is greatly reduced.

There was tested a tire according to the invention of dimension 30–7.7 R 16 comprising:

as carcass reinforcement, three circumferential alignments of first reinforcing threads formed of adherent plied yarns of a linear density of 501 tex produced from three identical aramid single yarns of 167 tex. The density of the first reinforcing threads was 88 t/dm in the zone of the beads;

as second reinforcing threads steel monofilaments of a diameter of 0.98 mm, distributed into 13 stacks 9 (see FIGS. 1 and 3):

three axially innermost stacks with 14, 17 and 20 turns, four stacks between the circumferential alignments 24 and 25 with 10, 14, 16 and 20 turns, three stacks between the circumferential alignments 25 and 26 with 19, 15 and 10 turns, and three axially outermost stacks with 14, 10 and 7 turns.

a crown reinforcement with three plies of reinforcing threads oriented substantially circumferentially, formed of adherent plied yarns of a linear density of 660 tex produced from two identical aramid single yarns of 330 tex; the reinforcing threads have a laying pitch of 1.2 mm.

The layer of mix of very high elasticity modulus had a secant modulus of extension at 10% deformation of 45 MPa and a Shore A hardness of 90.

This tire underwent bursting-resistance tests. The maximum pressures measured were of the order of 100 bar. It was also characterized by an amount of elongation of its development between zero pressure and its operating pressure of 15 bar of the order of 1.5%. The tire also successfully underwent takeoff tests similar to the standardized tests for certification of aircraft tires.

The building of the tire according to the invention may advantageously be effected on a rigid core which imposes the form of its inner cavity, such as those described by EP 242 840 (U.S. Pat. No. 4,895,692) or EP 822 047 (U.S. Pat. No. 6,224,808), all of which are hereby incorporated in the present application by reference for all purposes. There are applied to this core, in the order required by the final architecture, all the constituents of the tire, which are arranged directly in their final position, without undergoing shaping at any moment of the building operation. The curing takes place on the core, the latter being removed only after the vulcanization phase.

This method of manufacture has the advantage of greatly reducing, or even eliminating, the pre-stresses imposed on the reinforcing threads, particularly those oriented at 0°, during the traditional shaping phases.

The solid tire may also be partially cooled on the core in order to keep the reinforcing threads in the state of deformation imposed upon laying.

Equivalently, it is also possible to manufacture the tire on a drum such as described in WO 97/47 463 (U.S. Pat. No. 6,234,227) or EP 0 718 090 (U.S. Pat. No. 6,000,454), provided that the shaping of the blank of the tire is effected before laying the circumferentially oriented reinforcing threads.

The circumferentially oriented reinforcing threads may also be laid on a form having a geometry identical to the form intended in the curing mould. The crown block is then assembled with the complementary blank of the tire using transfer techniques known to the person skilled in the art, then, still using known principles, the tire is fitted and pressurized by deploying a membrane inside the tire.

This embodiment also guarantees the absence of pre-stresses due to the shaping in the vulcanization press.

Although the invention has been described herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

What is claimed is:

1. A tire, comprising a crown, two sidewalls and two beads, a carcass reinforcement anchored in each of the beads and a crown reinforcement, wherein the carcass reinforcement comprises at least two circumferential alignments of first reinforcing threads of high elasticity modulus, each circumferential alignment of said first reinforcing threads being, within each bead, bordered axially by second reinforcing threads oriented substantially circumferentially of a modulus greater than or equal to that of said first reinforcing threads, said first reinforcing threads and second reinforcing threads being separated by a layer of mix of very high elasticity modulus, and wherein said second reinforcing threads are formed of monofilaments or unit threads arranged in a spiral and selected from the group consisting of carbon, tungsten, high-modulus aramid and steel reinforcing threads.

2. A tire according to claim 1, wherein said second reinforcing threads of said anchoring means are formed of monofilaments or unit threads of steel.

3. A tire according to claim 1, wherein said second reinforcing threads are steel monofilaments of a diameter of between 0.7 and 1.3 mm.

4. A tire according to claim 1, wherein each circumferential alignment of said first reinforcing threads is, within each bead, bordered axially inwardly and axially outwardly by said second reinforcing threads oriented substantially circumferentially.

5. A tire according to claim 1, wherein, where $\Sigma R_I$ is the total of the rigidities of extension of the second reinforcing threads arranged axially inwardly relative to the carcass reinforcement and where $\Sigma R_E$ is the total of the rigidities of extension of the second reinforcing threads arranged axially on either side of the carcass reinforcement:

$$0.6 \leq \frac{\sum R_I}{\sum R_E} \leq 1.5.$$

6. A tire according to claim 5, wherein:

$$0.7 \leq \frac{\sum R_I}{\sum R_E} \leq 1.3.$$

7. A tire according to claim 1, wherein, the outer surface of the beads comprises a seat, a frustoconical wall of substantially radial orientation located radially inwardly adjacent to a wall section in the shape of an arc of a circle EF of center C, said center C being arranged axially outwardly relative to the bead, and all the second reinforcing threads are arranged at a radial distance from the axis A less than or equal to the locus of a straight line CD passing through the center C and the bead and forming an angle of +45±5 degrees relative to the axis A of the tire.

8. A tire according to claim 1, wherein each of said beads has an outer surface intended to come into contact with a corresponding surface of the seat and of the hook of a rim on which the tire is to be mounted, and wherein, after mounting of the tire on said rim and inflation of said tire, the contact zone between said outer surface of said bead and said rim extends as far as a point B of the hook of maximum radius $R_J$.

9. A tire according to claim 8, wherein $\Phi$ is the diameter of the circumference of the outer surface of the bead intended to come to bear against the circumference of the hook of the rim of maximum radius $R_J$, and:

$$\Phi = 2(R_J - \epsilon)$$

with $\epsilon$ being between 0.5 and 2 mm.

10. A tire according to claim 1, wherein the carcass reinforcement is formed of at most three circumferential alignments of said first reinforcing threads of high elasticity modulus.

11. A tire according to claim 1, wherein said first reinforcing threads of the carcass reinforcement form forward and return paths arranged adjacently, with, at the level of each bead, loops connecting one forward path to one return path each time.

12. A tire according to claim 1, wherein the reinforcing threads of high elasticity modulus have a secant modulus of extension greater than 1000 cN/tex.

13. A tire according to claim 12, wherein the reinforcing threads of high elasticity modulus are formed of aromatic polyamide.

14. A tire according to claim 1, wherein the layer of mix of very high elasticity modulus has a secant modulus of extension at 10% deformation greater than 20 MPa.

15. A tire according to claim 14, wherein said secant modulus of extension at 10% deformation is greater than 30 MPa.

16. An aircraft tire according to claim 1, wherein the layer of mix of very high elasticity modulus has a Shore A hardness of greater than 70.

* * * * *